United States Patent [19]

Lane

[11] 4,148,702

[45] Apr. 10, 1979

[54] TREATMENT OF COATED FABRIC SCRAP

[75] Inventor: Maxwell J. Lane, Mt. Eliza, Australia

[73] Assignee: Nylex Corporation Limited, Australia

[21] Appl. No.: 603,760

[22] Filed: Aug. 11, 1975

[30] Foreign Application Priority Data

Aug. 14, 1974 [AU] Australia ............................. PB8518

[51] Int. Cl.² ............................ C08J 3/28; C08L 3/00
[52] U.S. Cl. ................................. 204/159.12; 260/2.3
[58] Field of Search .................... 260/2.3; 204/159.12, 204/160.1; 427/44, 36, 35

[56] References Cited

U.S. PATENT DOCUMENTS

| Re. 28,914 | 7/1976 | Marco | 427/44 |
| 3,352,773 | 11/1967 | Schwartz et al. | 204/160.1 |
| 3,624,009 | 11/1971 | Sussman et al. | 260/2.3 |
| 3,794,465 | 2/1974 | Baron | 427/44 |

OTHER PUBLICATIONS

Chapiro, *Radiation Chem. of Poly. Systems*, (Interscience, 1962) pp. 467–469, 534–535.

Primary Examiner—Thomas De Benedictis
Attorney, Agent, or Firm—O'Brien and Marks

[57] ABSTRACT

Composite scrap materials having one or more polymer components and a fabric component are rendered reprocessable by subjecting them to high energy radiation at a dose sufficient to selectively degrade at least one component of the material leaving the other component or components substantially unchanged.

7 Claims, No Drawings

TREATMENT OF COATED FABRIC SCRAP

This invention relates to a method for treatment of polymer coated fabric so that it may be reclaimed and reprocessed in normal mixing and compounding operations.

During the production of vinyl- and other polymer-coated fabric and in subsequent fabrication processes, significant quantities of waste and scrap materials such as off-cuts, edge trim and cut-outs are generated. There are great economic incentives to make use of this scrap and various methods have been developed, usually based on mechanical or solution separation of the polymer and fabric backing. The term "scrap" as used herein will be understood to include both waste and scrap materials.

Such processes usually involve physical separation of the two components of polymer coating and fabric and are inconvenient in use or require costly equipment such as that for solvent recovery. This is mentioned in the prior art, for example, in U.S. Pat. No. 3,624,009 and also described in the Society of Plastics Engineers Journal 1973, Vol. 22, p. 45-49.

Another prior art approach is that of chemical decomposition of fibres in the fabric. This technique is limited to products having exposed fibre on one face of the product and also requires awkward or expensive processing materials and equipment. This has been mentioned previously for example in Australian Patent Application No. 8609/72 now abandoned.

One example of a potential use of coated fabric scrap, in particular polyvinyl chloride (PVC) coated cotton fabric (referred to herein as "VCF") is in the manufacture of flooring tiles, where the scrap may be granulated and compounded in the usual manner. For this purpose, it is necessary for the cotton to be broken down mechanically, to permit processing by ordinary methods, and to then act as a filler in the plasticised PVC matrix. Previous attempts to process the scrap without granulating have led to unsatisfactory results as the cotton strands are not broken down during processing and thus their presence leads to poor mixing, excessive power consumption and machinery maintenance problems. Subjecting normal granulated VCF scrap merely to heat and mechanical shearing results in a material which is very difficult to process because of the strength of the fabric substrate and its resistance to mechanical degradation.

It is thus a principal object of the present invention to provide a method whereby VCF and like polymer-coated fabrics can be more readily reprocessed by normal mixing and compounding operations.

We have found that by subjecting VCF and other polymer-coated fabrics to high energy radiation, significant changes occur in the properties of the material.

Firstly, the material exhibits increased adhesion to hot rolls of two-roll mills and is thus capable of being subjected to normal PVC processing such as mechanical mixing and shearing at high temperatures. It is also apparent that some degradation of mechanical properties of the cotton arises from the irradiation resulting in rapid breakdown of the woven fabric and thus such normal processing is possible.

The term "high energy radiation" as used herein is synonymous with "ionizing radiation" and in its broadest sense included all radiation having an energy above about 10–30 eV. However, for practical purposes, i.e. to achieve the required radiation dose over a realistic period of time, the radiation used will have an energy of the order of 0.1 to 10 MeV. In any event it is the radiation dose which is the more critical parameter.

Suitable high energy radiation includes, for example, radiation from an isotopic source, such as $Co^{60}$, or from an electron accelerator. Generally the radiation dose should be sufficient to result in rapid breakdown of the fabric under normal processing conditions, but not so high as to induce unwanted degradation of the poly(vinylchloride) or other polymeric material associated with the fabric. A dose of about 2.5 to about 10 Megarads, preferably about 4 to about 7 Megarads, is generally most satisfactory for VCF but higher or lower doses may be desirable for other materials.

Thus, in accordance with one aspect of the present invention there is provided a method for rendering a polymer-coated fabric scrap suitable for reprocessing in which the scrap is subjected to high energy radiation, the radiation dose being sufficient to result in rapid breakdown of the fabric under normal processing conditions but insufficient to induce significant degradation of the polymer.

Preferably the radiation dose is from about 2.5 to about 10 Megarads, more preferably about 4 to about 7 Megarads.

The products most suited to the methods now disclosed are commonly known as vinyl-coated fabric or VCF materials. The backing fabrics may be cotton or cotton-Vinylon (a proprietary poly(vinyl alcohol) polymer) mixtures.

The coatings may be of the vinyl plastisol or calendered film (subsequently laminated to the fabric) principally consisting of polyvinyl chloride, plasticisers such as phthalate esters or organic phosphates, pigments, stabilizers etc. and optical blowing or expanding agents. Such coatings are widely known, and are used as upholstery, clothing and other apparel materials and in a variety of industrial applications.

In normal manufacturing operations a wide range of resin coating and laminating formulations and fabric backings are used. There are for example, solid or cellular-plus-solid layers of vinyl compositions, typically having the following components:

| | |
|---|---|
| PVC Resin | 100 parts by weight |
| Plasticizer (diisooctyl phthalate, triisooctyl trimellitate phosphate esters etc.) | 50–80 parts by weight |
| Filler (calcium carbonate, clays etc.) | 0–50 parts by weight |
| Stabilizers | 2–5 parts by weight |
| Pigments etc. | Variable |

A wide range of uses is covered by such materials, from upholstery, wall covering, clothing, footwear and those skilled in the art will be familiar with typical compositions in each case.

In the coating or laminating of film operations the fabric backing is left with a free or uncovered edge. On trimming the finished product, it is desirable to waste the minimum of both fabric and coating and with different products, a different quantity of each component will be present. When such trim scrap is the major feed component of the reclamation process, it is obvious that its overall composition will be highly variable. Other types of scrap such as off-cuts, rejects due to unsatisfactory quality etc. will be of more consistent ratio of coating to fabric (within any product category).

Fabrics used are predominantly knitted or woven, although in special cases such as footwear or flooring products there may be non-woven materials. The latter will usually be a minor proportion of the treatable scrap and where expedient, may be separated for special treatment. As mentioned before, cotton or cotton plus polyvinylacetate-polyvinylalcohol are the fibres most commonly used.

Fabrics are most frequently of 4-7 oz/sq. yd. (135-240 g/m$^2$) for knitted types, and 3-9 oz/sq. yd. (100-300 g/m$^2$) for wovens. Total product weight of coated fabric for major-volume lines (wall covering, upholstery) varies from 6.5-28 oz/sq. yd. (220-955 g/m$^2$).

The overall range of feed stock to the recovery process may thus vary from a heavy coated fabric of about 28 oz/sq. yd to a product consisting mainly of trim scrap of a light-weight coated product which in the case of a knitted backing fabric of 4 oz/sq. yd. of which 50% is uncoated, would give an average weight of coating plus fibre of 5 oz/sq. yd.

It has not heretofore been known to treat coated fabrics by high energy particle radiation in the course of reprocessing of scrap or waste. It was totally unexpected that irradiation would allow reprocessing with breakdown of the fibre content of such materials but without excessive degradation of the polymeric coating material. A further unexpected advantage is that, under conditions as described herein the products have good milling and mixing characteristics.

Other polymer-fabric compositions suitable for irradiation processing by the method of the invention are thermoplastic polyurethanes on fabrics such as cotton and other degradable fibre structures. The fabric backing or fibrous reinforcement may be in the form of woven, knitted or non-woven material.

More generally the products suited to the method of this invention will consist of polymer-fibre coatings or laminates in which the polymeric components are substantially less sensitive to breakdown under high energy radiation than the fibrous components or layers, at least under the conditions and radiation dosages chose to degrade the fibre.

An alternative aspect of the invention consists of subjecting to irradiation composites in which the fibres are more irradiation resistant than the coating polymer or polymeric bonding agent. In this instance, a valuable fibre may be recovered in preference to the polymer and used for further reinforcement of the same or dissimilar systems. An example is the recovery of fibre from scrap consisting of a thin butyl rubber coating on a heavy reinforcing fibre backing.

In its boardest form, therefore, the invention provides a method for facilitating the reprocessing of scrap materials having a composite structure consisting of one or more polymer components and a fibre or fabric component, which method comprises subjecting the scrap material to high energy radiation at a dose rate sufficient to bring about selective degradation of at least the fibre or fabric component of the material but which leaves the polymer component or components substantially unchanged.

In a further aspect, the invention may also be used to recover a component of a co-extruded, or multilayered, structured film by degradation of one or more of the unwanted film components.

The method of irradiation will be dependent on the physical form of scrap material. For example, the products in strip or cut form may be loosely baled or bundled if being treated by batch process in a gamma ray unit in which deep particle penetration is normally achieved. Alternatively, sheet or roll products may conveniently be passed in a continuous or semi-continuous process under an electron beam of high energy, e.g., from an insulating core transformer type electron accelerator, such as that made by the High Voltage Engineering Corporation of Massachusetts, U.S.A.

The criterion which will essentially determine the behaviour of the treated materials will be radiation dosage, whichever approach is used.

In selecting the methods for reprocessing the irradiated scrap, it is desirable to use, as far as possible, equipment and techniques already in common use in the industry which supplies vinyl compounds for an end use where there is potential for scrap recovery and rework. For applications involving PVC—containing compositions for moulding, such as pressing of floor tiles, or injection or extrusion processes, it is common to use as feed material, mixtures of PVC resin, plasticiser, inert inorganic filler and additives such as stabilizers, lubricants, pigments and the like. These physical mixtures are commonly known in this industry as "compounds" and this term is used hereafter in this context.

The conventional mixing processes may include blending of powders such as fillers and additives, followed by melt blending of resin, fillers, plasticiser and final cutting of the cooled melt into a suitable form for moulding (such as granules or "chips"). Equipment used as the melt-plasticising stage is frequently of the intensive shear type such as "Banbury" units or heated rolls or a combination of these, alternatively a variety of compounder-extruders (such as Farrel, Buss, or Werner & Fleiderer machines).

The prior art requires that a scrap feed to such melt plasticiser-mixers must be in a convenient physical form, such as granules or medium sized particles; a thin continuous strip can be fed to some types of mixer. Shredders and other cutting or chopping devices are well known and can reduce large areas of sheet or strip to convenient lengths for feed to a plasticiser-mixer.

The present invention, however, can obviate the necessity to carry out such operations on scrap feed, with obvious advantages in terms of cost and other factors.

The invention is further described and illustrated in the following Examples.

EXAMPLE 1

The experiments described were carried out with a vinyl coated fabric trim scrap, made with a woven cotton backing. Approximate analysis of this product was

| PVC Resin | 37% | (including some additives as described above) |
| --- | --- | --- |
| Plasticiser | 24% | (mainly di-iso-octyl phthalate) |
| Filler (coated calcium carbonate) | 10% | |
| Cotton Fibre | 29% | |

Samples were prepared from this scrap and tested for physical properties, four alternative procedures, as follows:

A. Irradiation of VCF trim scrap at dosages of 2.5 and 5.0 Megarad (MR) followed by laboratory Banbury milling, roll milling and hot pressing.

B. Granulation of VCF trim scrap, irradiation at 5 MR followed by processing as above.

C. Granulation and milling as above, without the irradiation step.

D. Milling as above, without granulation or irradiation. Irradiation was performed with a Cobalt-60 source of gamma rays (1.173 and 1.333 MeV), the scrap being bundled and passed through the beam in a way which ensured even exposure to the energy source. Other process variables and results of physical testing are summarized in Table 1, below.

TABLE 2

| Compound type | UTS (KPa) | % EB | BSS | TA (mg) |
| --- | --- | --- | --- | --- |
| General purpose extrusion | 19370 | 210% | 9 ± 4 | |
| Flooring (heavily filled with limestone) | 13831 | 15% | 4 ± 3 | 138 |

Of these two compounds, properties of an irradiated scrap compound such as A or B are fairly close to those of the flooring compound. Elongation at break is the main problem but those skilled in the art would readily perceive ways to use such scrap in a suitable blend, e.g.

TABLE 1

| Procedure Type | Ex. No. | Treatment of VCF Trim scrap Condition[1] | γ Dose | Lab.Banbury processing[2] Time in Banbury | Banbury Drop Temp. | Mill Processing[3] Mill Temperature | Time on Mill | Comment | Press Condition Temp. | Total Cycle Time | Time at Full Pressure | Properties[4] UTS (KPa) | % EB | BSS | SG | TA (mg) |
| --- | --- | --- | --- | --- | --- | --- | --- | --- | --- | --- | --- | --- | --- | --- | --- | --- |
| A | 1 | NG | 2.5 MR | 8 min | 152° C. | 154° C. | 9 min | milled easily | 135° C. | 17.5 min | 4 min | 7,814 | <10% | 4 | 1.32 | 78 |
| A | 2 | NG | 5 MR | 4 min | 158° C. | 154° C. | 6 min | " | 135° C. | 18 min | " | 10,545 | <10% | 5 | 1.31 | 39 |
| B | 3 | G | 5 MR | 5.5 min | 154° C. | 154° C. | 8.9 min | " | 135° C. | 19 min | " | 7,616 | <10% | 8 | 1.34 | 28 |
| C | 4 | G | Nil | 8.5 min | 168° C. | 160° C. | 7 min | " | 182° C. | 18 min | " | 15,395 | <10% | 6 | 1.33 | 55 |
| D | 5 | NG | Nil | 7 min | 164° C. | 157° C. | 25 min | " | 182° C. | 20 min | " | 12,915 | <10% | 3 | 1.27 | 105 |

[1]NG = not granulated
G = granulated
[2]Laboratory model Banbury:capacity about 500 g; Steam Pressure 690 KPa
[3]Mill Steam Pressure 449 KPa
[4]UTS = Ultimate tensile strength
%EB = Percentage elongation at break BSS = British Standard softness
SG = Specific gravity
TA = Taber abrasion (weight loss for 1000 cycles on an $H_{22}$ wheel under a 1 kg load).

The above results are supported by observation, in that Examples 2 and 3, the samples irradiated at 5 MR processed most easily. Processing for Examples 1 and 4 was similar but the material of Example 5 was considerably more difficult to mix in the Banbury Roll milling was relatively easy for all samples following the Banbury step. It is notable that irradiation of the scrap could yield very good processability, even without preliminary granulation. (Granulation of a fibre substrate is objectionable because a considerable quantity of fine fibrous "dust" is generated in the working area which can be both unpleasant and a fire hazard.)

Tensile strengths of the processed materials were all of a satisfactory order for a reprocessed material which would not, absent the present treatment process, be employed in other than moderate proportions in blends with virgin ingredients when formulating for any chosen use. The generally lower tensiles for those samples which had been irradiated is not a great practical disadvantage and it would certainly not negate the useful benefits obtained in reduced processing times.

Properties of some commercial types of PVC Compounds are given below in Table 2 and comparison of these would suggest a ready application for scrap reprocessed into compound by any of the alternatives A - D of Table 1.

with additional filler, resin and plasticiser. By such means, performance comparable to normal flooring compounds can readily be obtained. Similarly, extrusion or injection compounds may be modified readily by blends of reprocessed scrap with standard ingredients.

EXAMPLE 2

The following description relates to a plant-scale operation of the method of the invention. The two formulations E and F were processed in a mill line consisting of a model 3D Banbury and two roll mill; Banbury temperature 340° F; Mill roll temperature 260° and 320° F. The process time in the Banbury was 10–12 minutes.

| Composition | A | B |
| --- | --- | --- |
| 5 MR Irradiated VCF scrap (as in Example 1) | 100 | 100 |
| PVC film scrap | 0 | 118 |
| Plasticiser (Diisoctyl phthlate) | 13 | 13 |
| Thermal Stabilizer (Ferro 7125) | 1.0 | 1.0 |
| Calcium Stearate | 0.6 | 0.6 |
| Carbon black (tintacarb 300; premixed 1:4 with plasticiser) | 2.5 | 2.5 |
| Properties | | |
| British Standard Softness | 24 | 27 |
| Specific Gravity | 1.3 | 1.23 |

Formulation B was selected for further trials because it was slightly easier to process and provided a less extreme departure from normal formulations (in terms of fibre content).

A garden hose was produced from formulation B by normal extrusion methods. The burst strength and general appearance of the product were as good as those produced from normal formulations.

Further extrusion tests showed that it was possible to extrude formulation B as a garden hose without the use of screens, thus demonstrating that the fibres present in the formulation after milling were only 0.1–0.2 mm long. The fibres in the original VCF scrap were up to about 10 mm long.

It should be noted here that it is virtually impossible to process VCF scrap in above manner when the scrap has not been irradiated.

EXAMPLE 3

An injection moulding compound was prepared as follows:

| | | |
|---|---|---|
| Formulation B (Example 2) | 125 | parts by weight |
| PVC resin (Geon 104) | 100 | |
| Plasticiser (DIOP) | 59 | |
| Thermal Stabilizer (Ferro 7125) | 1.0 | |
| Carbon black (Tintacarb 300; premixed 1:4 with plasticiser) | 3.5 | |
| Filler (Omya BSH: coated calcium carbonate) | 15 | |
| Thermal Stabilizer (Mark C) | 0.6 | |
| Epoxy Stabilizer (Lankro GE) | 3.0 | |
| Lubricant (Stearic acid) | 0.6 | |
| Chlorinated polyethylene (ICI Cerechlor S.52) | 10 | |

The above compound had satisfactory properties for moulding by injection methods into a shoe sole.

The examples given herein clearly show that the principal and novel advantage of the irradiation process is its ability to yield an easily processable resin coated fabric scrap, without extreme degradation of the polymer coating material.

I claim:

1. A method for facilitating the processing of scrap materials having a composite structure consisting of one or more polymer components and a fibre or fabric component, which method comprises, subjecting the scrap material to high energy radiation to a total dosage sufficient to selectively degrade the fibre or fabric component but which is insufficient to induce significant degradation of the polymer, and recovering the irradiated scrap for reprocessing.

2. A method as claimed in claim 1, wherein the scrap is a VCF scrap.

3. A method as claimed in claim 2, wherein the radiation dose is from about 2.5 to about 10 Megarads.

4. A method as claimed in claim 3, wherein the radiation dose is from about 4 to about 7 Megarads.

5. The reprocessed scrap material prepared by the method of claim 1.

6. A method of using scrap materials formed of one or more polymer components and a fibre or fabric component which method comprises subjecting the scrap material to high energy radiation to a total dosage sufficient to selectively degrade the fibre or fabric component but which is insufficient to induce significant degradation of the polymer and compounding the irradiated scrap by mechanical means with other components to form a compound.

7. A method of using scrap comprising a fabric coated with polyvinyl chloride which method comprises subjecting the scrap to high energy radiation to a total dosage sufficient to selectively degrade the fabric but which is insufficient to induce significant degradation of the polyvinyl chloride and compounding the irradiated scrap with polyvinyl chloride, a plasticizer and a stabilizer to form a compound.

* * * * *